(12) United States Patent
Nilges

(10) Patent No.: US 6,626,016 B2
(45) Date of Patent: Sep. 30, 2003

(54) TAMPER RESISTANT ENCAPSULATED PADLOCK/INTEGRAL HIDDEN HINGE ANTI-THEFT DEVICE

(76) Inventor: Kathy Ann Nilges, 421 Epperson St., Moberly, MO (US) 65270

( * ) Notice: Subject to any disclaimer, the term of this patent is extended or adjusted under 35 U.S.C. 154(b) by 35 days.

(21) Appl. No.: 10/004,683

(22) Filed: Dec. 7, 2001

(65) Prior Publication Data

US 2003/0106348 A1 Jun. 12, 2003

(51) Int. Cl.$^7$ .............................................. E05B 73/00
(52) U.S. Cl. ................................. 70/14; 70/58; 70/232
(58) Field of Search .......................... 70/14, 18, 19, 70/229–232, 58, 54–56

(56) References Cited

U.S. PATENT DOCUMENTS

| | | | | |
|---|---|---|---|---|
| 2,641,124 A | * | 6/1953 | Gallagher et al. | 70/232 |
| 2,656,706 A | * | 10/1953 | Lucas et al. | 70/232 |
| 2,785,564 A | * | 3/1957 | Rossi | 70/232 |
| 3,004,421 A | * | 10/1961 | Bowler | 70/232 |
| 3,269,159 A | * | 8/1966 | Young | 70/232 |
| 3,415,085 A | * | 12/1968 | Eble, Jr. | 70/232 |
| 3,763,675 A | * | 10/1973 | Hofmeister et al. | 70/232 |
| 3,798,938 A | * | 3/1974 | McCullum | 70/232 X |
| 3,832,872 A | * | 9/1974 | Gerlach | 70/232 |
| 3,922,897 A | * | 12/1975 | Mickelson | 70/232 |
| 3,982,413 A | * | 9/1976 | Stone et al. | 70/229 |
| 4,300,373 A | * | 11/1981 | Camos et al. | 70/232 |
| 4,620,718 A | * | 11/1986 | Mickelson | 70/232 X |
| 4,697,444 A | * | 10/1987 | Maffey | 70/232 |
| 4,704,883 A | * | 11/1987 | Dykes | 70/232 |
| 4,823,568 A | * | 4/1989 | Rogers et al. | 70/58 |
| 4,841,756 A | * | 6/1989 | Curtis | 70/232 |
| 5,033,280 A | * | 7/1991 | Johnson | 70/232 |
| 5,259,223 A | * | 11/1993 | Nee | 70/232 |
| 5,297,407 A | * | 3/1994 | Tarr | 70/232 |
| 5,421,601 A | * | 6/1995 | Hinze et al. | 70/232 X |
| 5,491,992 A | * | 2/1996 | Mandall | 70/232 |
| 5,775,139 A | * | 7/1998 | Sellers | 70/14 |
| 5,845,520 A | * | 12/1998 | Dolev | 70/232 X |
| 6,161,402 A | * | 12/2000 | Moore | 70/14 |
| 6,427,496 B1 | * | 8/2002 | Hurst | 70/14 |

* cited by examiner

*Primary Examiner*—Suzanne Dino Barrett

(57) ABSTRACT

A secure, anti-theft, tamper resistant locking device for $5^{th}$ wheel type trailer hitch pins which conceals the padlock and the hinge inside a solid block of aluminum, which is placed around the 2" pin of the $5^{th}$ wheel trailer, thus denying access to the hitch pin for towing.

1 Claim, 12 Drawing Sheets

FIG. 1
CUT AWAY VIEW
LOCKING SEQUENCE
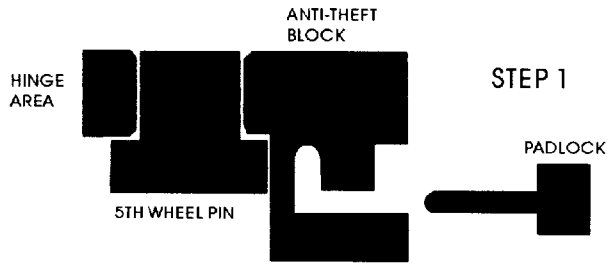
STEP 1
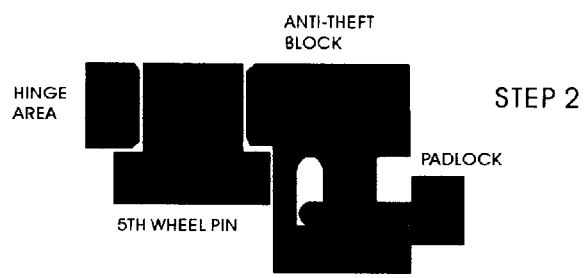
STEP 2
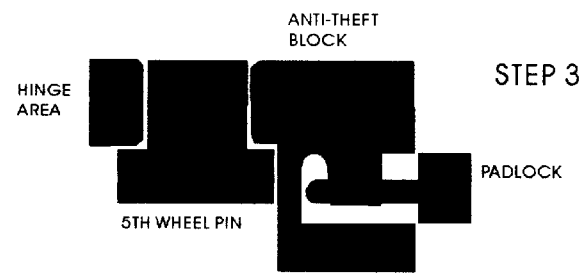
STEP 3
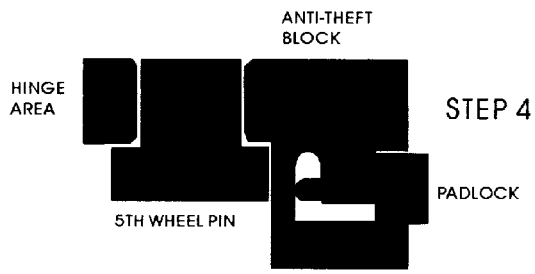
STEP 4

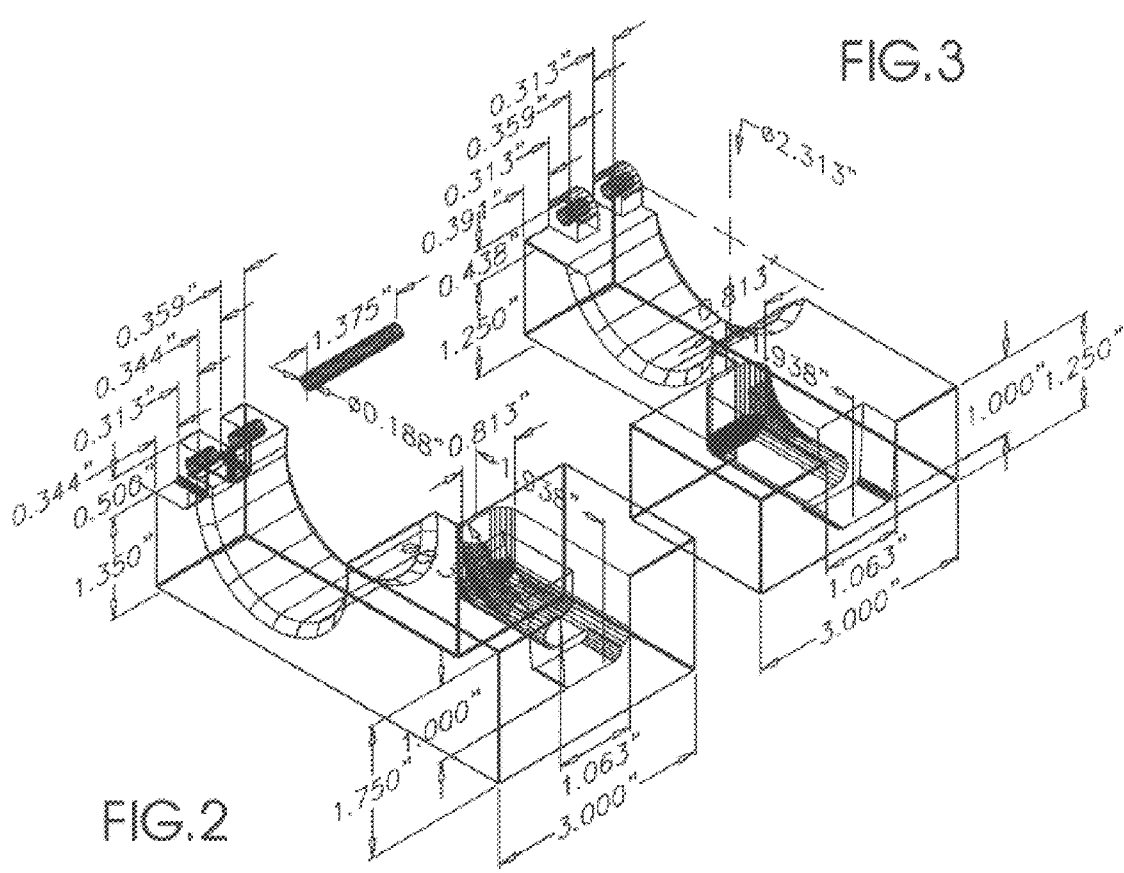

TAMPER RESISTANT ENCAPSULATED PADLOCK/INTEGRAL HIDDEN HINGE ANTI-THEFT DEVICE

CROSS-REFERENCE TO RELATED APPLICATIONS

Disclosure document filed on this invention in Jul. 2001, Document #496865.

STATEMENT REGARDING FEDERALLY SPONSORED RESEARCH OR DEVELOPMENT

N/A

REFERENCE TO A MICROFICHE APPENDIX

N/A

BACKGROUND OF THE INVENTION

The field of endeavor to which this invention pertains is anti-theft, tamper resistant locking devices.

Upon hearing of the theft of a $5^{th}$ wheel camping trailer, I, being the owner of a $5^{th}$ wheel camping trailer, recognized the need for a locking device/anti-theft device for $5^{th}$ wheel hitch pins.

After exploring the market for available locking products, I became aware that, to the best of my knowledge, the only products that existed had exposed locks and hinges that could easily be compromised with a hack saw, hammer, or bolt cutters. My idea for an anti-theft device was a recessed pocket containing the padlock and channels for the lock shank integrated into a solid block of steel or aluminum, which would allow the padlock to be inside the block of steel. This invention would prevent access to the lock shank, preventing cutting of the shank. This invention would also limit access to the padlock body, preventing the lock being compromised by blunt force being applied to the body.

The second part of my idea involved a hinge system for the invention that would make the hinge pin inaccessible.

I shared my idea with my husband, Delmar Nilges, who then shared it with David Blatt for help in developing and testing the idea in October of 2000.

After much research, trial and error, and prototypes, the invention described in this application was developed. To the best of my knowledge, I believe this invention to be unique and it contains systems and mechanical process that do not exist in today's market.

The result of our experimentation and development is a combination between the hinge design and locking design that prevents the device from being compromised even if the hinge is totally destroyed.

BRIEF SUMMARY OF THE INVENTION

This invention is an anti-theft locking device for any $5^{th}$ wheel type trailer. On the market now are locking devices for $5^{th}$ wheel trailers that have exposed hinges and exposed padlocks. The devices now available are easily compromised by cutting the padlock shank or the hinge. This invention solves this problem by channeling and pocketing the padlock into a solid block of aluminum and machining the hinge directly into the solid block with the hinge pin concealed in the block. The combination of the padlock channels and pocket along with the hinge design make it virtually impossible to remove the device from the $5^{th}$ wheel pin.

The device is closed around the pin of the $5^{th}$ wheel hitch on the trailer. The padlock is then inserted into the channels in the block halves and raised, then inserted into the padlock pocket. See drawings page 1, FIG. 1 for diagram of locking sequence.

Test have shown, that with the device installed with the hinge pin removed, the device, still, can not be removed because of the design of the padlock channels and pocket.

BRIEF DESCRIPTION OF THE SEVERAL VIEWS OF THE DRAWING

FIG. 1 Cut away view from the side of the device. Shows sequence of inserting the padlock into the block haves, then raising the padlock to insert into pocket.

FIG. 2 Top view of left block half. Dimensions for machining.

FIG. 3 Top view of right block half. Dimensions for machining.

DETAILED DESCRIPTION OF THE INVENTION

Figure 4:
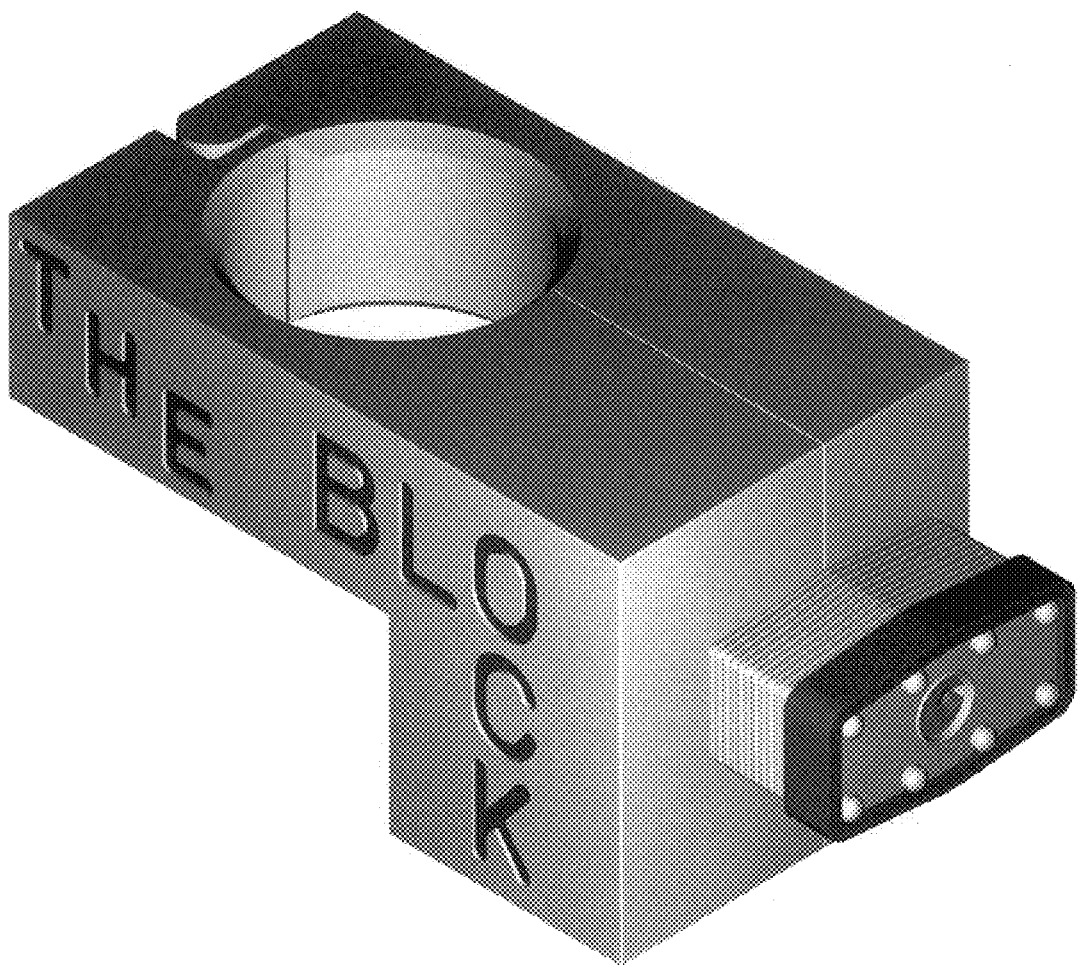
FIG. 4 Shaded drawing of invention with two halves assembled and padlock inserted to the locked position.
Figure 5:
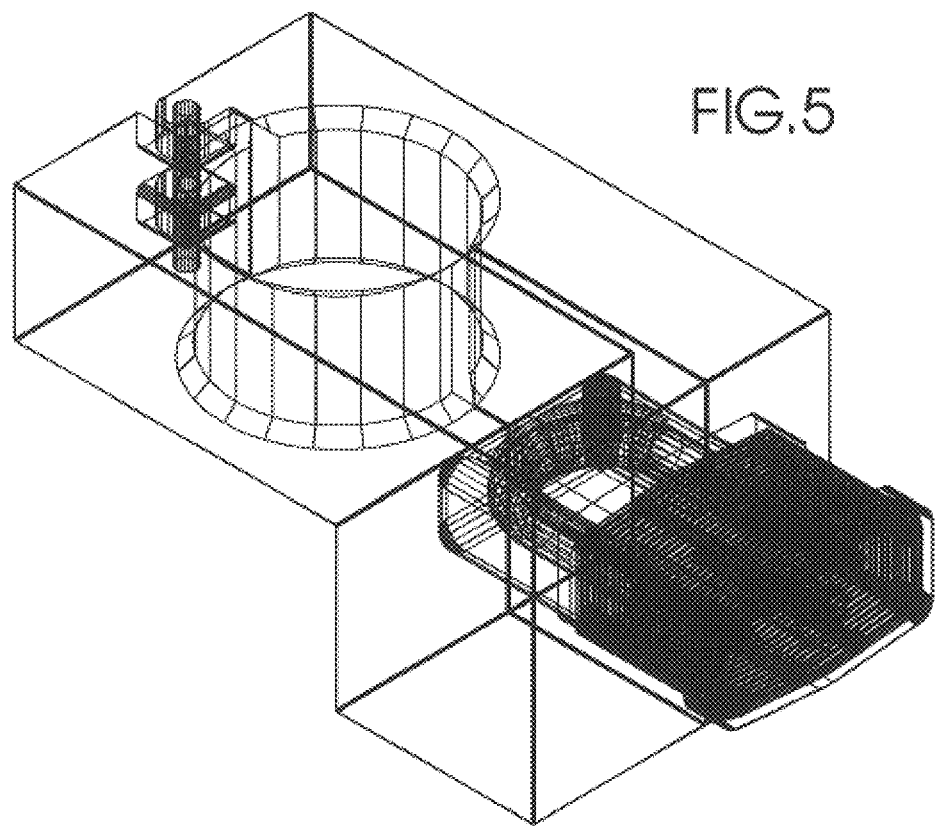
FIG. 5 Wire frame drawing of invention with padlock inserted into pocket in locked position. Also shows detail of hinge design. Top view.
Figure 6:
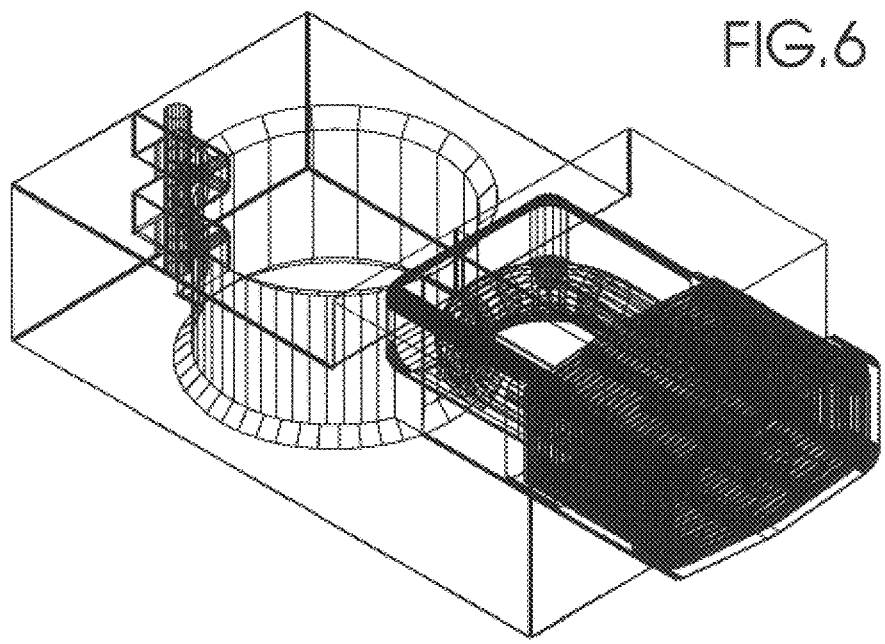
FIG. 6 Bottom view of invention. Wire frame showing lock inserted to locked position.
Figure 7:
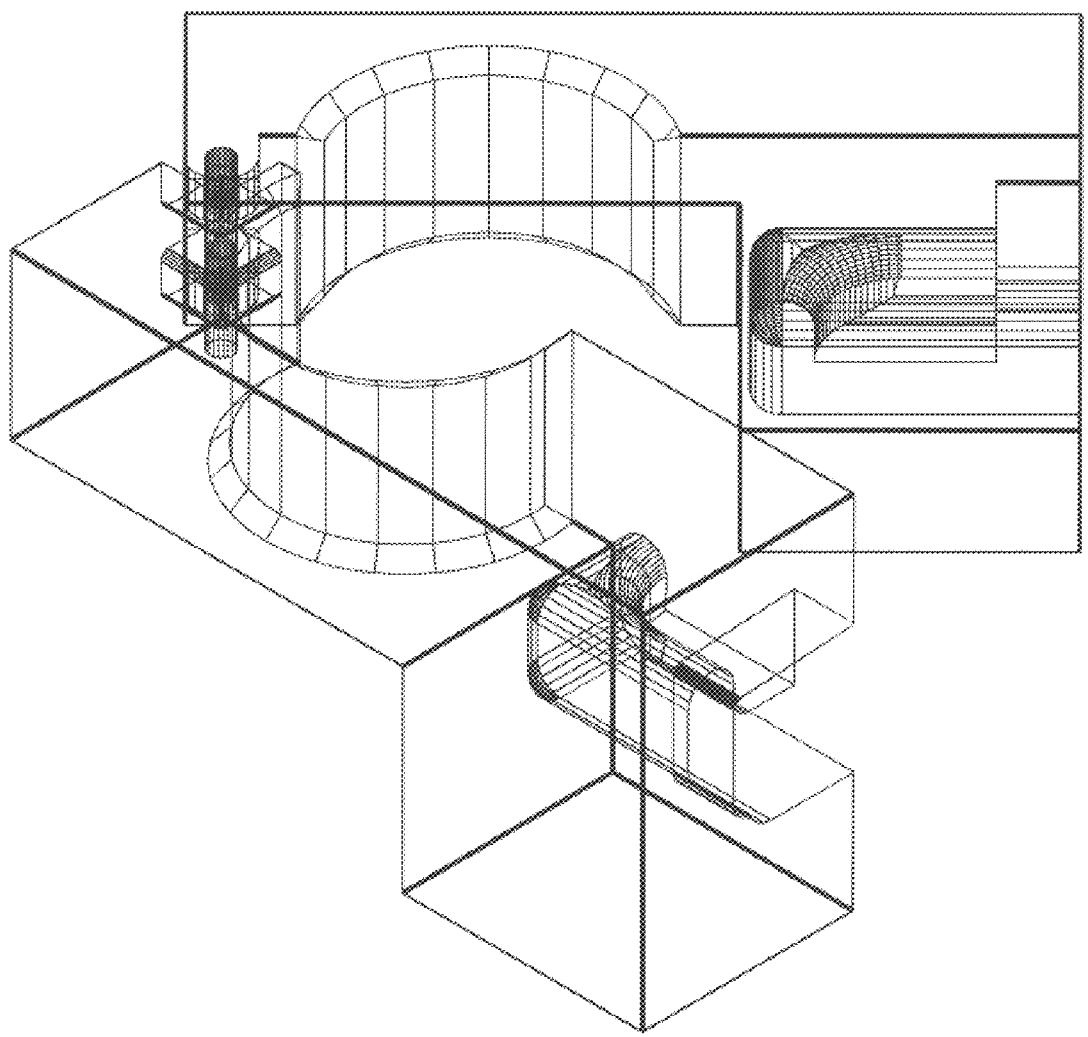
FIG. 7 Wire frame drawing showing two block halves opened to a 30-degree angle. Shows padlock channeling and pocket.
Figure 8:
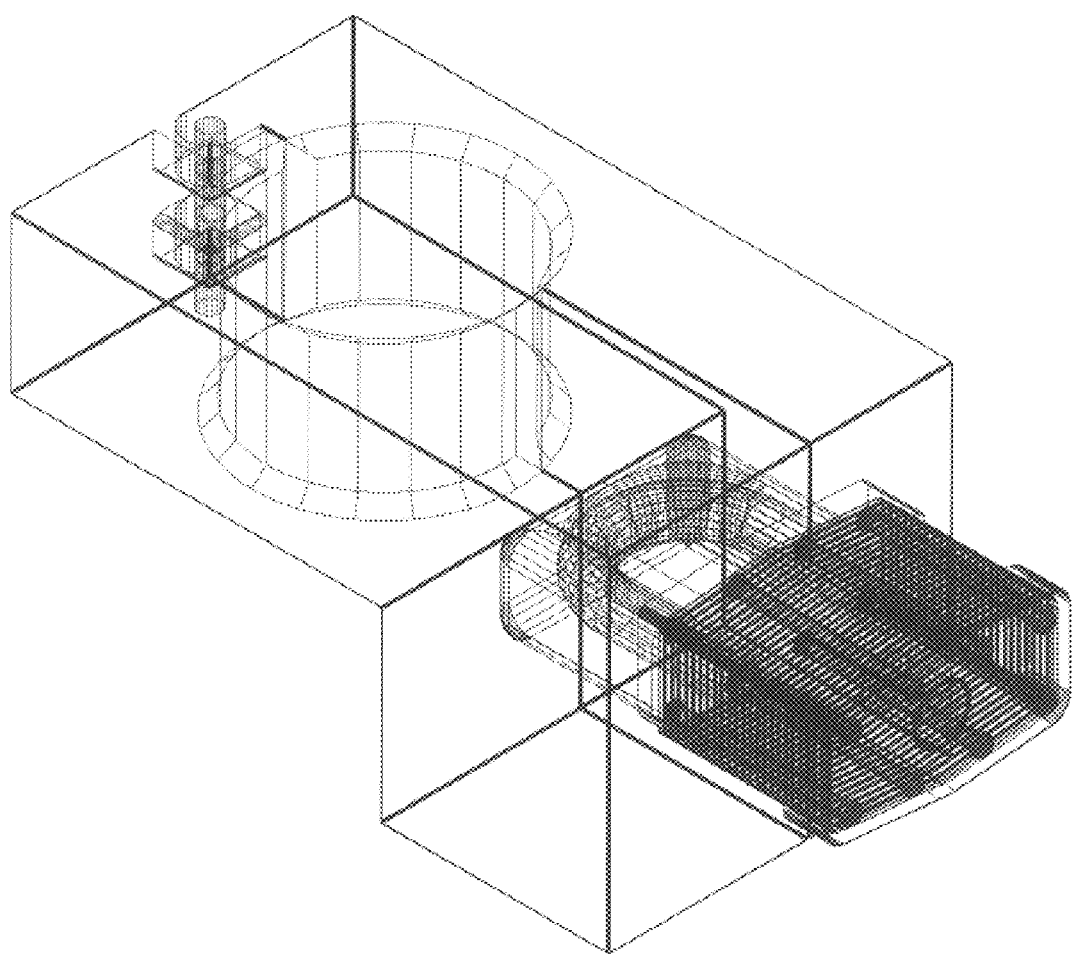
FIG. 8 Wire frame drawing showing invention with padlock inserted into channels in the unlocked position.
Figure 9:
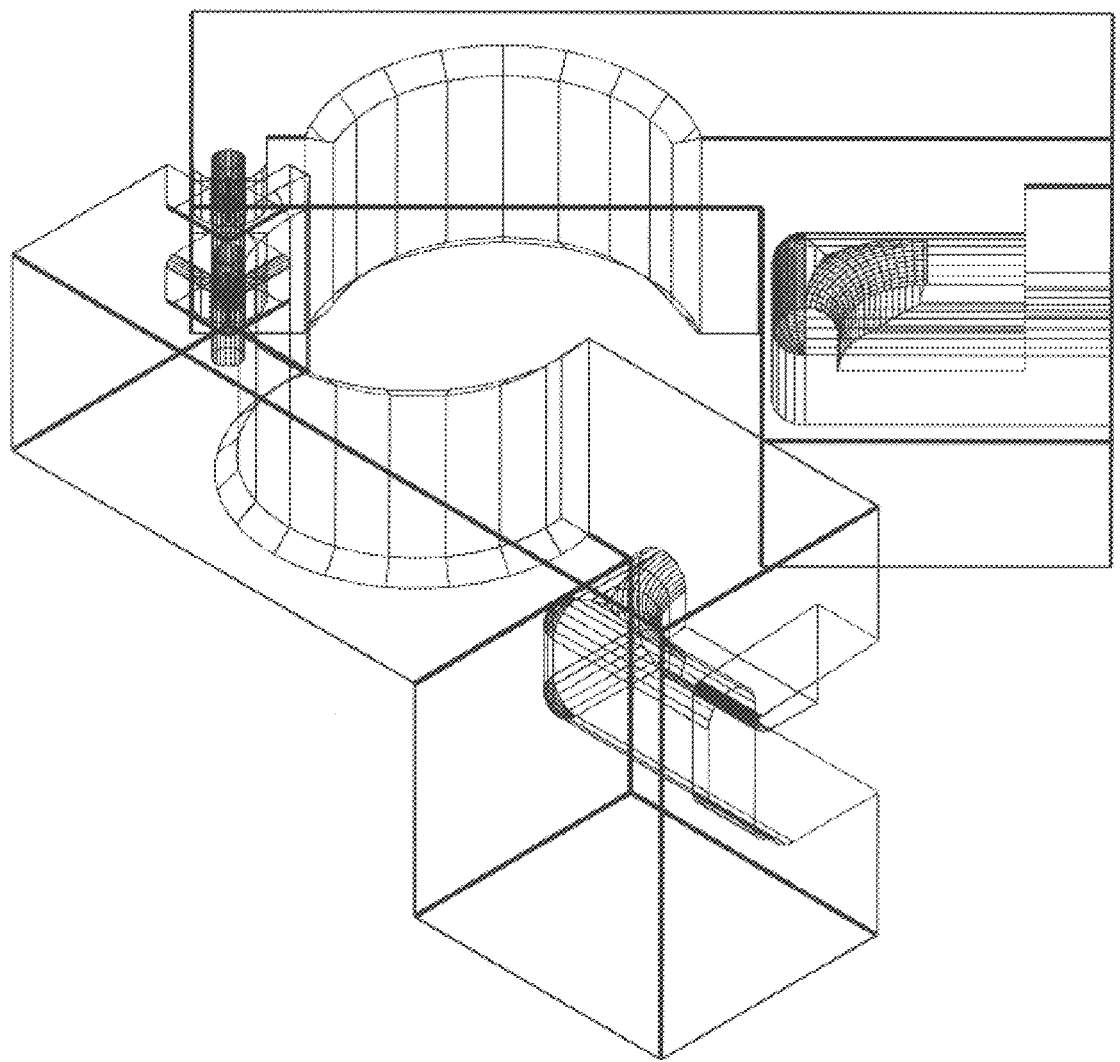
FIG. 9 Wire frame view of invention with block halves opened to a 30 degree angle.
Figure 10:
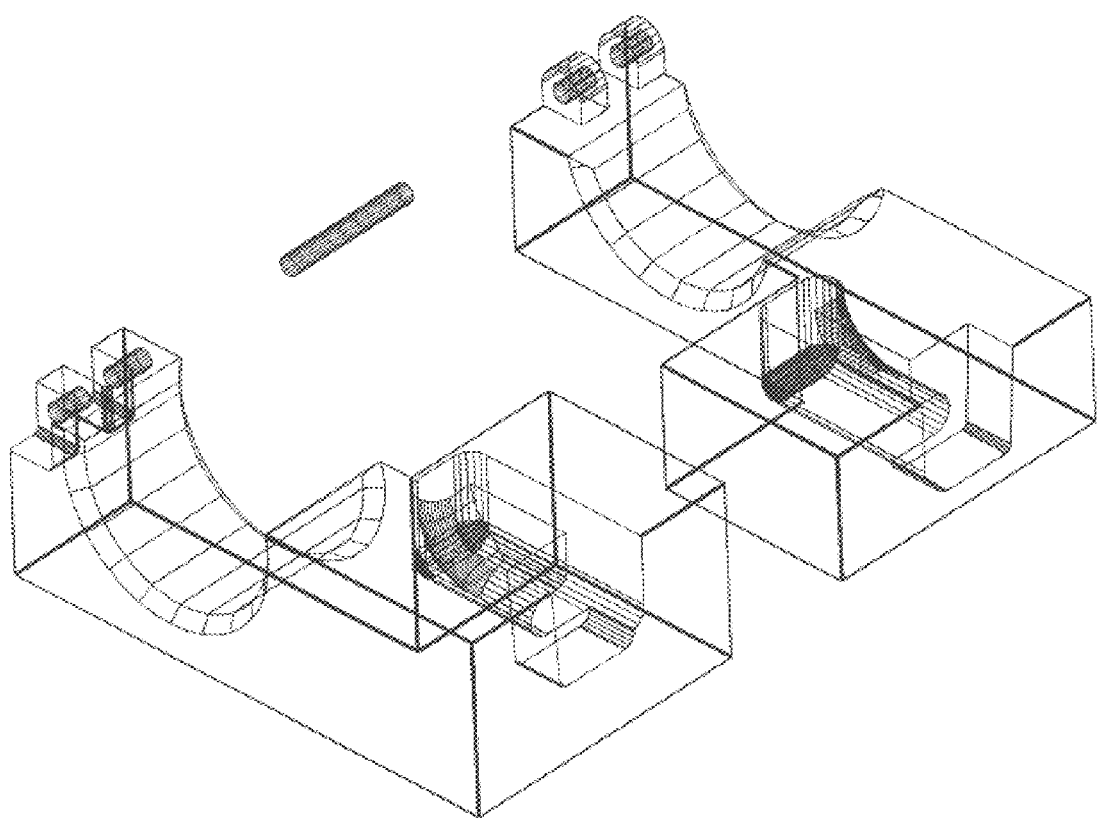
FIG. 10 Wire frame exploded view of two halves and hinge pin.
Figure 11:
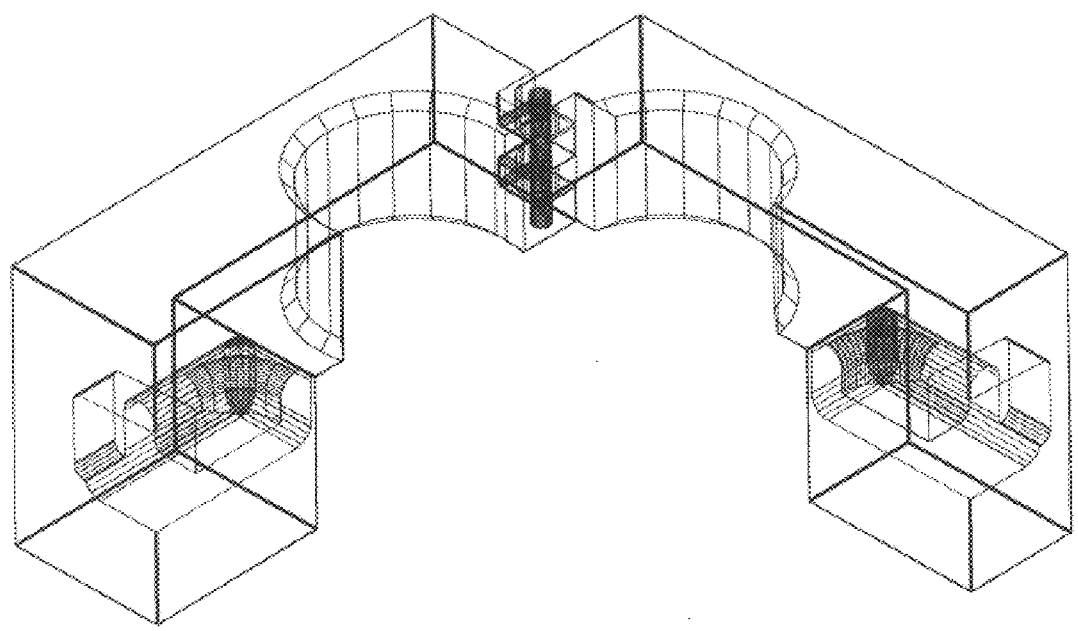
FIG. 11 Wire frame drawing of invention with hinge pin inserted and two halves opened to a 90-degree angle.
Figure 12:
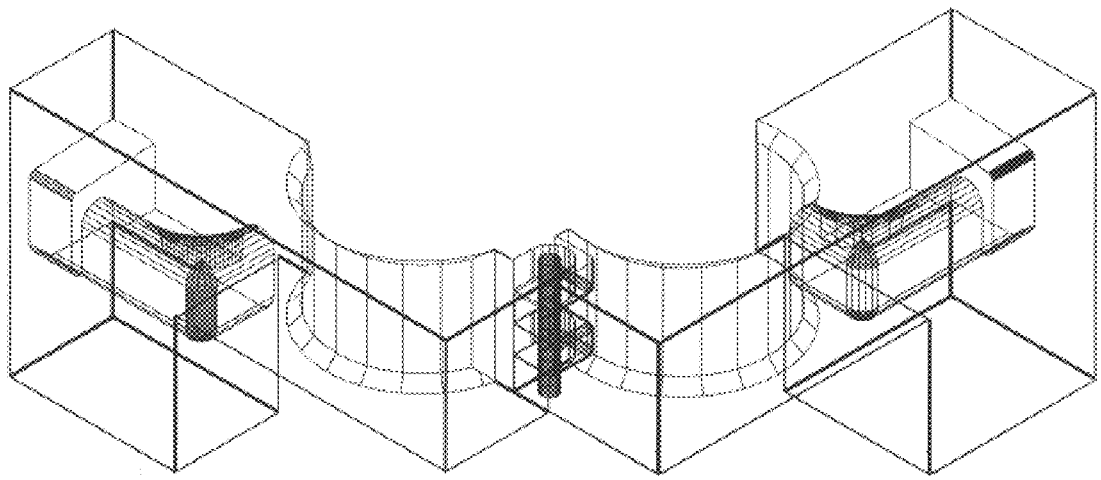
FIG. 12 Wire frame drawing of the invention showing two halves opened to a 90-degree angle showing detail of hinge area.
Figure 13:
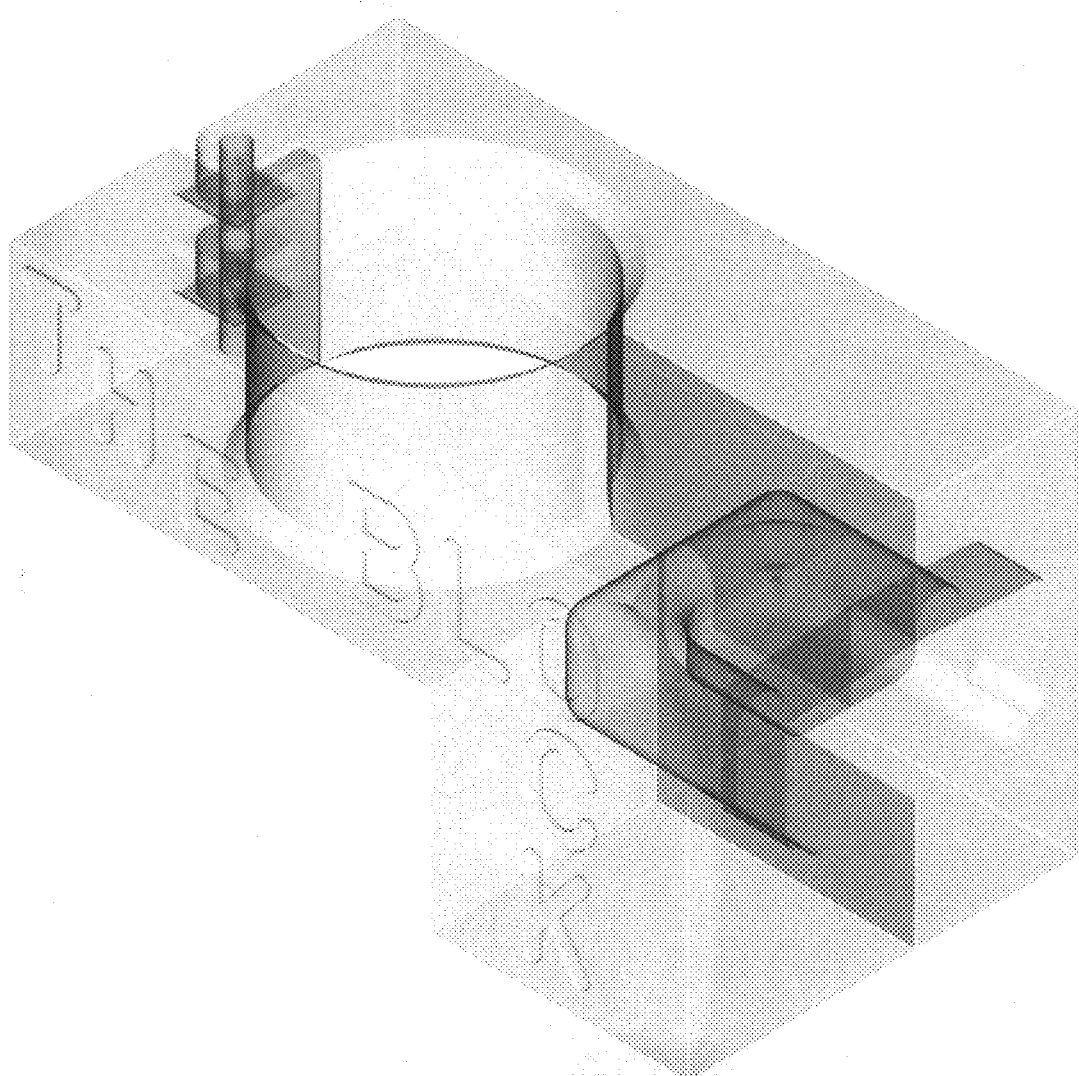
FIG. 13 Transparent view of the invention showing two halves closed to the locked position with no padlock installed.
Figure 14:
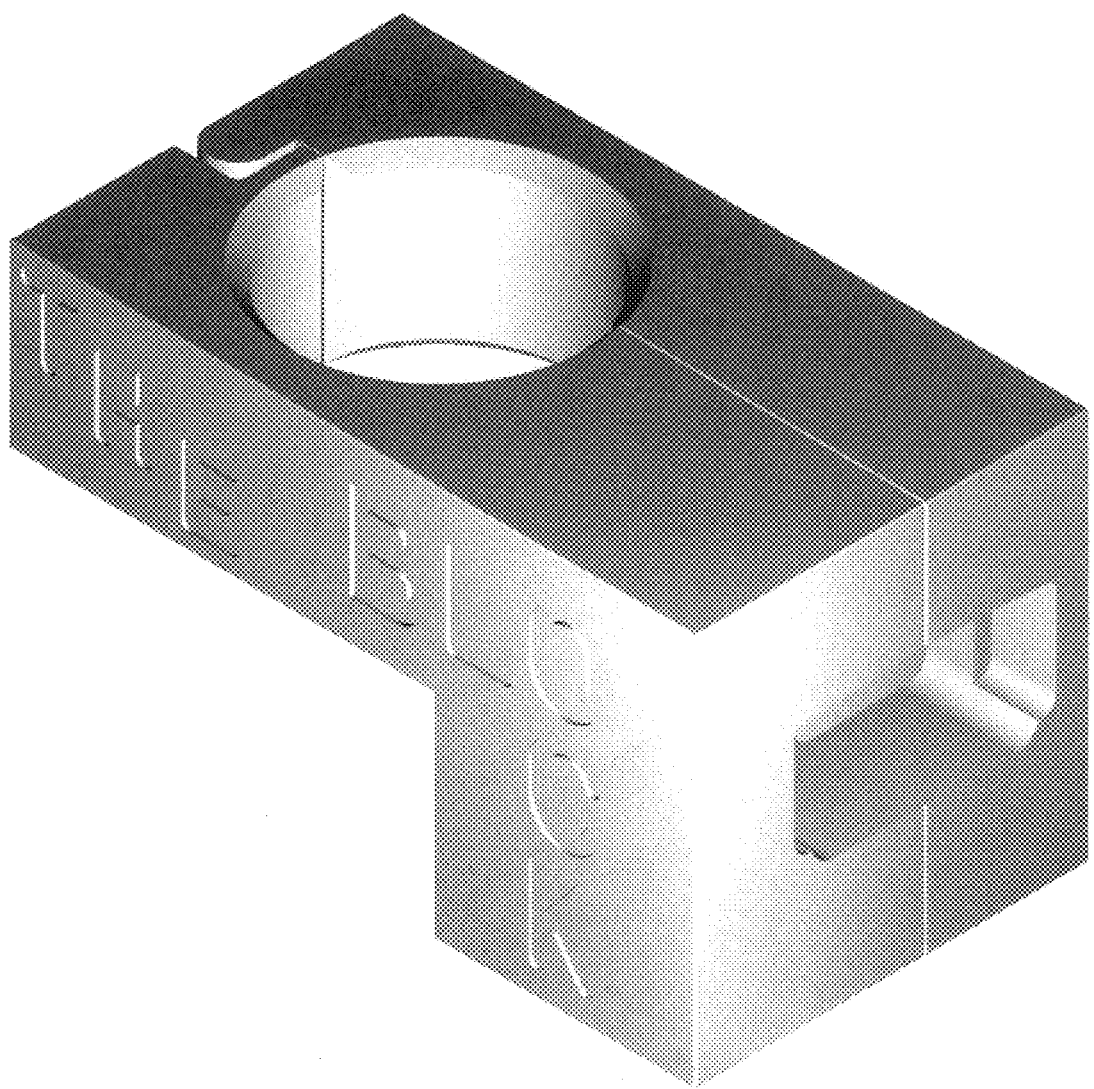
FIG. 14 Shaded view of the invention in the closed position with no padlock installed.

This invention is an anti-theft locking device for any $5^{th}$ wheel type trailer. It is comprised of two blocks of billet aluminum in which channels and a pocket are machined to allow for a pad lock to be inserted into the two block halves—resulting in a secure bond between the two halves with the padlock being encapsulated inside the aluminum blocks, protecting the lock shank and body from access. The two block halves are hinged on the opposite side of the lock pocket by an integrated tooth design machined directly into the block halves. The two halves are joined at the hinge by a $3/16"$ diameter Hardened pin being inserted vertically through the hinge teeth of the two halves. The pin-holes, top and bottom, are then tig welded closed to prevent access to the pin.

When this channeled padlock design and toothed hinge design are utilized together on opposite ends of these blocks, the result is a very secure locking system. The design of the padlock channels prevents the two halves from being separated even if the hinge were totally removed.

The contour of the 5<sup>th</sup> wheel pin is machined into the two halves of the device. The device is placed around the 2" pin of the 5<sup>th</sup> wheel hitch and the lock is then inserted into the channeled pocket. The presence of this device on the hitch prevents it from being connected to any vehicle for towing.

The device is made up of three components:
1) Right side block
2) Left side block
3) Hinge pin The device can be machined with ordinary machine shop tooling and machines. Our prototypes were produced using Master Cam software and all machining was done on a Supermax CNC knee mill with a Centurion V control.

Material 2 each, 1¾" thick×3" wide×5½" long aluminum bar stock, 1 each, 3/16" diameter×15/16" long hardened drill rod.

Operations to Produce

1<sup>ST</sup> Operation

Saw and face ends of two aluminum blocks to 5⅜" long.

2<sup>ND</sup> Operation-Right Block Half

Mill 1¾" thickness to 1¼" except for hinge teeth. Machine hinge teeth to print specs. All sides of hinge teeth must have radius of ⅛" to allow for clearance during swing of halves. Machine ⅜" padlock shank, "L" shaped, channel in face to print specs. Use ⅜" ball nose end mill.

3<sup>RD</sup> Operation-Left Block Half

Machine hinge teeth, Radius all tooth edges ⅛". Machine ⅜" diameter Lock shank, "L" shaped, channel in face to print specs. Use ⅜" ball nose end mill.

4<sup>TH</sup> Operation

Clamp parts together in vise—mill 2.030" diameter pocket thru. Drill and ream 3/16" diameter Hole thru hinge teeth. Per print.

5<sup>TH</sup> Operation

Install 3/16" pin-clamp parts in vise, on end, machine padlock pocket and "U" shaped ⅜" channel to print specs.

6<sup>TH</sup> OPERATION

Turn parts over in vise and machine 3¼"×1.600" step down. Per print specs.

7<sup>TH</sup> Operation

Remove pin, de-bur all edges, sand and polish blocks. Re-install pin, tig weld ends of pin-holes closed.

Use and Utility of Invention

This pocket and channeling design for encapsulating the padlock has a wide range of possible uses. The available products now on the market leave the lock shank exposed as well as the lock body. This allows for access to cut the shank with bolt cutters or hack saw and the body of the lock exposed for possible destruction with a hammer.

The ⅜" diameter Channel and pocket for the lock body are offset in such a way to allow the lock to be raised ⅜" in the shank channel then the body of the padlock inserted into the body pocket. See FIG. 1. This design prevents the lock from being removed unless unlocked with a key. This channeling and pocket for the lock also forms a secure bond between the two halves of the device-even if the hinge is totally removed the two halves can-not be pried apart. The two halves would have to be pried open to a gap of 2.0" to clear the 2.0" pin of the 5<sup>th</sup> wheel, which is encapsulated within the blocks. Test have shown that with the padlock installed and the hinge pin removed, the two halve have no more than 1/16" gap in the hinge area.

We have also experimented with making the blocks out of tool steel (A2) and heat-treating the blocks to a Rockwell hardness of 58 after machining. This results in an almost indestructible finished product although at considerably higher production cost.

This channeling and pocketing could be incorporated into virtually any locking application:
a) 5<sup>th</sup> wheel trailer, RV, Utility, Farm, Construction, Heavy equip.
b) Gate locks
c) Valve locks (gas pipeline, steam, water, etc.)
d) Storage sheds
e) Construction sheds
f) Boat trailers
g) Etc.

On the market at this time are products that simply weld a shield around the padlock. The invention discussed in this application actually encapsulates the padlock into solid blocks of aluminum or steel, thus distinguishing from the prior art. The novelty of this invention, rest in the channeling and pocket to enclose the padlock and in the combining of the hinge design with the channeling and pocket for the padlock. In combination, the result is unlike any locking system on the market at this time.

What is claimed is:

1. A lock for fifth wheel type trailers with a concealed padlock and hinge machined directly into solid aluminum block halves,
   said lock will lock around a king pin of any fifth wheel truck trailer, R.V. or construction trailer thus preventing connection of the trailer to a vehicle, said lock comprising:
   a pair of solid aluminum block halves having a mating pair of hinges machined in one end of said block halves allowing a swinging motion of said halves to open and close around the king pin as one unit, and horizontal and vertical channels and a pad-lock body pocket machined in an opposite end of said solid block halves for a locking mechanism, one half of the channels and pad-lock body pocket being machined into each solid block half,
   the inside diameter bore of said block halves being substantially equal to the diameter of a circumferential king pin groove to permit the block halves to be received in locking position around the king pin and completely encase the same,
   said aluminum block halves being rectangular in shape with an "L" shaped step machined to the thickness of the groove in the king pin allowing insertion around said groove,
   said solid aluminum block halves machined on the opposite end from said hinge with channels and the pocket allowing insertion of a shank type pad-lock into said channels and pocket, said channels and pocket being substantially equal to the diameter of said pad-lock to permit tight locking fit of said two solid block halves when closed around the king pin and said pad-lock inserted into said channels and pocket, the lock end of said solid blocks being of substantial size and thickness to allow for said pad-lock channels and pocket machining, said pocket for said pad-lock machined to a specific depth of the working mechanism of the padlock shank measured from open to closed position of the padlock shank and machined to the same diameter of the pad-lock body allowing for the pad-lock shank being in the locked position when fully inserted into said pocket, said machined channels being offset a distance equal to the diameter of the pad-lock shank facilitating pad-lock shank insertion into said horizontal channel then said shank raised into said vertical channel which, in this raised position aligns the pad-lock body with the machined pocket, said pad-lock then inserted into said pocket concealing the pad-lock body and placing the pad-lock in the locked position where, in this position the pad-lock shank and body being encased inside the two solid block halves are inaccessible and the solid block halves are bound together until the padlock is placed in the un-locked position with a pad-lock key.

* * * * *